United States Patent

Neukam

Patent Number: 5,701,719
Date of Patent: Dec. 30, 1997

[54] LOADING DEVICE

[75] Inventor: Helmut Neukam, Hausmannstätten, Austria

[73] Assignee: P.E.E.M. Förderanlagen Gesellschaft m.b.H., Graz, Austria

[21] Appl. No.: 604,860

[22] Filed: Feb. 22, 1996

[30] Foreign Application Priority Data

Mar. 31, 1995 [AT] Austria ............ 581/95

[51] Int. Cl.⁶ ............ B65B 1/04; B65B 3/04; B65B 5/00
[52] U.S. Cl. ............ 53/247; 53/248; 53/255; 53/257; 53/260; 222/561
[58] Field of Search ............ 53/247, 248, 255, 53/257, 260; 222/502, 504, 527, 528, 561; 141/177, 391, 367

[56] References Cited

U.S. PATENT DOCUMENTS

| | | | |
|---|---|---|---|
| 3,498,022 | 3/1970 | Godet | 53/248 |
| 3,942,303 | 3/1976 | Kristainsen | 53/247 |
| 4,003,185 | 1/1977 | Goff | 53/248 |
| 4,460,110 | 7/1984 | Helander | 222/528 |
| 4,506,492 | 3/1985 | Boyd | 53/260 |
| 4,570,419 | 2/1986 | Tinsley | 53/247 |

FOREIGN PATENT DOCUMENTS

| | | | |
|---|---|---|---|
| 2267959 | 12/1975 | France | 222/561 |
| 722-795 | 3/1980 | U.S.S.R. | 53/248 |

Primary Examiner—John Sipos
Assistant Examiner—Gene L. Kim
Attorney, Agent, or Firm—Collard & Roe, P.C.

[57] ABSTRACT

Loading device, particularly for loading containers carried on a conveyor, including a vertically fixed funnel with a shutter arranged in the area of its delivery aperture. In order to ensure reliable loading of the containers in such a device, it is provided that lateral of the funnel, adjustable covering elements, such as slides, are arranged, which can be positioned close to the upper rims of the containers, which may vary in their vertical dimensions.

5 Claims, 2 Drawing Sheets

LOADING DEVICE

FIELD OF THE INVENTION

The invention relates to a loading device, particularly for the loading of containers being transported along on a conveyor, in which device a vertically fixed funnel with a shutter arranged in the area of its delivery aperture is provided.

With such loading devices, which are often used in automated systems for selectively taking articles from a warehouse to combine them according to an order, such systems being known to a person skilled in the art as picking systems, the problem always occuring is that only containers of the same height can be used, which is often undesirable with orders of only few and small goods. On the other hand, if containers of different heights are employed, there is a danger of goods falling aside rather than into the container due to the longer free-falling path resulting from a lower container, and therefore an order being shipped incomplete.

SUMMARY OF THE INVENTION

It is the object of the present invention to avoid these disadvantages and to propose a loading device of the kind mentioned above which allows the employment of containers of different heights and still ensures that the single goods falling from the funnel fall into the respective container with a very high degree of reliability.

According to the invention, this is reached in a loading device of the kind mentioned above through covering elements such as slides arranged before and after the funnel viewed in the conveying direction which may be positioned close to the upper rims of the containers, which may vary in their vertical dimensions.

Through the provided covering elements, the distance between the delivery opening of the funnel and the upper rim of a low container can be covered in a simple manner to ensure that single goods can not fall aside the provided container or bounce back out of the container after hitting its bottom. Slides are particularly effective as covering elements, but flexible flaps whose bottom rim can be lowered to a certain degree may also be provided. For such a solution, it is necessary that the flaps consist of a flexible but relatively heavy material (such as synthetic rubber).

For driving the slides, cylinder-piston arrangements acted upon by a pressured medium may effectively be provided. Generally, however, it is also possible to employ other drive units, such as electric motors driving the slide by means of a cable connection.

Through adjustably arranging the slides substantially parallel to the sloping sidewalls of the funnel, they can be positioned at a small distance to the funnel, ensuring that in the position corresponding to the lowest containers, the unobstructed distance between the lower rims of the slides is substantially equal to the unobstructed width of the container. This effectively prevents goods from falling out of the low container.

In order to prevent single goods from bouncing out of a low container, at the same time making sure that the containers are properly aligned in the area of the funnel, guard plates extending downwards and proceeding substantially parallel to the conveying direction of the containers are mounted to the funnel. Said guard plates reach at least close to the upper rims of the containers but preferably underneath said upper rims. Further said guard plates are preferably connected to guiding plates running outwardly in a direction contrary to the conveying direction of said containers to achieve a correct alignment of said containers.

The shutter of the funnel may be formed by lamellar segments interconnected by a strip of flexible material such as textile fabric, the shutter thereby allowing to be rolled up on rollers. Combined with slides arranged parallel as well as perpendicular to the conveying direction of the conveyor, this has the advantage of a very simple solution with regard to construction which effectively prevents single goods from falling out when containers of low vertical dimensions are being filled.

DETAILED DESCRIPTION OF THE INVENTION

Figure 1:
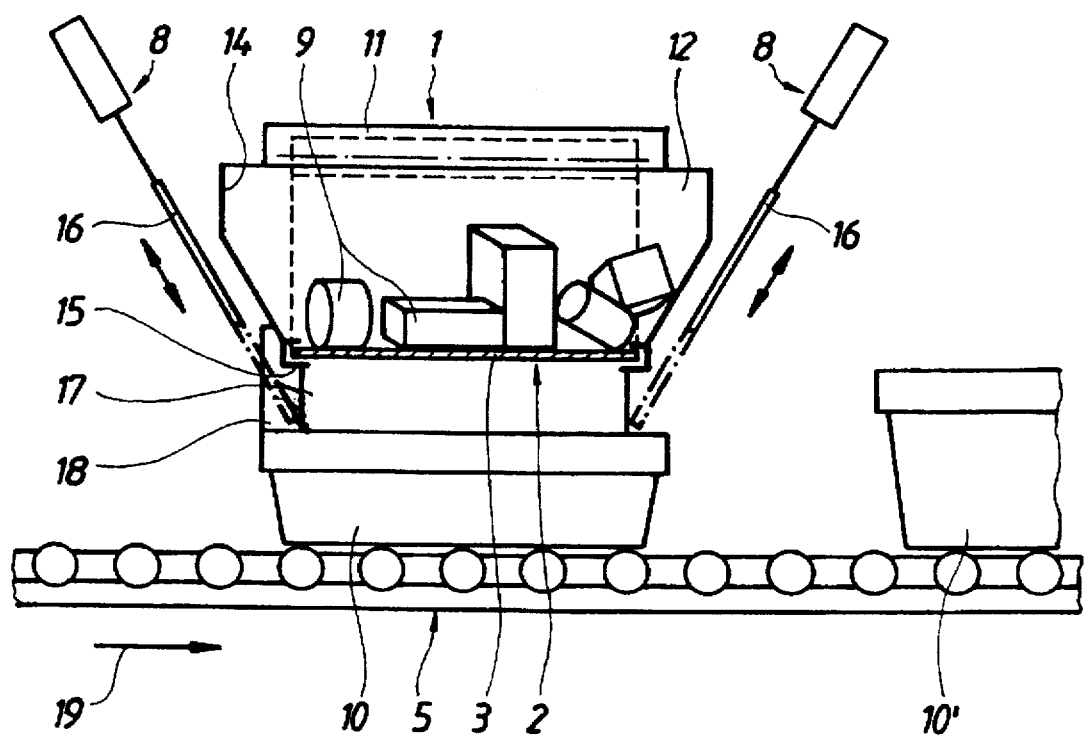
Figure 2:
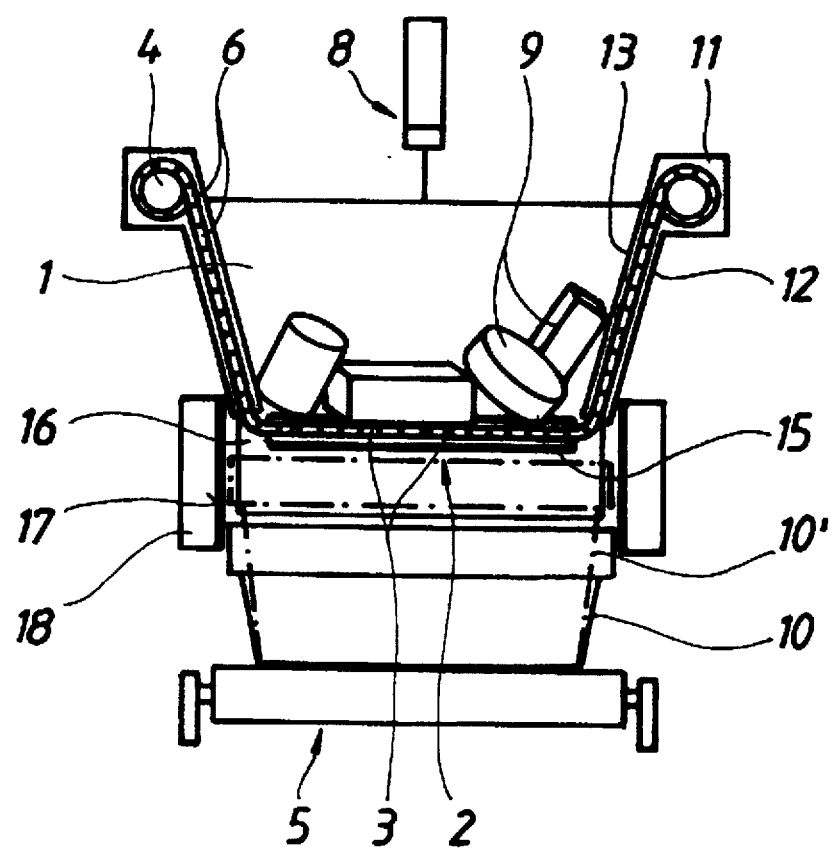

The invention will now be described in detail according to the drawings, in which:

FIG. 1 schematically shows a loading device according the invention in lateral view with the funnel drawn in section, and FIG. 2 schematically shows a front view of the loading device according FIG. 1 with the funnel drawn in section.

In a loading device according the invention, a funnel 1 is provided which includes a shutter 2. This shutter 2 is formed by two strips 3, comprising lamellar segments 6 flexibly interconnected by a strip of textile fabric, which my be rolled up on rollers 4, which proceed in the longitudinal direction of a conveyor 5. These rollers 4 are mounted in casings 11 which are arranged lateral of the upper rim of the funnel, including a drive unit not shown in the drawings. (FIG. 2)

The strips 3 run inside the funnel 1 and are covered by a covering 13 comprising the shape of a bonnet in the area of the sidewalls 12 of the funnel 1. In the area of the front sides 14 of the funnel 1, which run substantially at a right angle to the conveyor 5, the strips 3 forming the shutter 2 are held in guideways 15, the strips 3 thereby forming the bottom of the funnel and supporting the goods 9 in their closed position.

On both sidewalls 12 of the funnel 1, which run parallel to the conveyor 5, guard plates 17 are provided which extend below the upper rims of the lower containers 10 in the illustrated embodiment. Thereby, only a very small gap remains between the outer walls of the containers 10, 10', which containers feature different heights, and the guard plates, the containers 10, 10' thereby being guided between these guard plates 17. This also ensures that no goods can bounce out of the containers 10, which feature a lower vertical dimension than the containers 10', when the containers are being loaded.

The guard plates 17 are connected to guiding plates 18 which run outwardly in a direction contrary the conveying direction of the conveyor path and which serve to help the containers slide into the area defined by the guard plates. In the illustrated exemplified embodiment, the transition from a guard plate 17 to the corresponding guiding plate 18, which is mounted as a single piece, is formed by a sharp bend 20.

Furthermore, viewed in the conveying direction of the conveyor 5, slides 16 are arranged in front of and behind the end walls 14 of the funnel 1, which slides are adjustable by means of cylinder-piston arrangements 8. This ensures that goods 9 are also prevented from falling out in the area of the end walls of the containers 10, 10'.

Loading a container 10, 10' now ensues as follows: as soon as a container 10, 10' has reached the position below the funnel 1, the two strips 3 are rolled up on the rollers 4 with the effect of the goods 9 falling down into the container 10, 10' which stands ready. Thereby, the slides 16 are adjusted to a height corresponding to the respective container 10, 10', resulting in only a small distance remaining between the upper rim of the container 10, 10' and the lower rim of the slide 16, or the lower rim of the funnel 1, respectively.

After loading the container 10, 10', the strips 3 are again rolled off the rollers 4, adjoining again through the effect of the guide contained in the covers 13 and of the guideways 15, and thereby closing the aperture of the funnel 1, allowing another set of goods 9 destined for a further order to be supplied into the funnel. This may, for example, take place by means of a conveyor belt (not illustrated in the drawings).

I claim:

1. A loading device for loading containers of different heights with pieces of different dimensions, which comprises
   (a) a conveyor carrying the containers and moving in a conveying direction,
   (b) a vertically fixed funnel arranged above the conveyor, the funnel having
      (1) sloping side walls extending substantially perpendicularly to the conveying direction and
      (2) a discharge aperture between the side walls, and
      (3) the conveyor moving respective ones of the containers into alignment with the discharge aperture,
   (c) a shutter arranged selectively to cover the discharge aperture to hold the pieces in the funnel and to be retracted therefrom to permit the pieces to fall through the discharge aperture into the respective containers aligned with the discharge aperture of the funnel, and
   (d) slides arranged adjacent the sloping side walls ahead and behind the funnel, viewed in the conveying direction, the slides extending substantially parallel to the sloping side walls of the funnel and having means for reciprocating said slides in a direction substantially parallel to the sloping side walls for positioning said slides closer to the upper rims of the containers.

2. The loading device of claim 1, further comprising fixed guard plates extending substantially parallel to the conveying direction between the funnel and at least close to the upper rims of the containers.

3. The loading device of claim 2, wherein the guard plates extend below the upper rims of the containers for guiding the containers between the guard plates.

4. The loading device of claim 3, further comprising guiding plates connected to the guard plates, the guiding plates running outwardly of the guard plates and extending therefrom in a direction opposite the conveying direction.

5. The loading device of claim 1, wherein the shutter is comprised of two strips of flexible material and lamellar segments interconnected by the flexible material, and a roller for each strip for permitting the strips to be rolled up to retract the shutter from the discharge aperture.

* * * * *